(12) United States Patent
Soliman et al.

(10) Patent No.: US 6,188,354 B1
(45) Date of Patent: Feb. 13, 2001

(54) METHOD AND APPARATUS FOR DETERMINING THE LOCATION OF A REMOTE STATION IN A CDMA COMMUNICATION NETWORK

(75) Inventors: Samir S. Soliman; Alkinoos Hector Vayanos, both of San Diego, CA (US)

(73) Assignee: Qualcomm Incorporated, San Diego, CA (US)

( * ) Notice: Under 35 U.S.C. 154(b), the term of this patent shall be extended for 0 days.

(21) Appl. No.: 09/280,948

(22) Filed: Mar. 29, 1999

(51) Int. Cl.⁷ ........................................ G01S 1/24
(52) U.S. Cl. ................ 342/387; 342/357.01; 342/357.1; 342/457
(58) Field of Search ............. 342/357.01, 357.1, 342/357.16, 357.06, 457, 387; 701/213

(56) References Cited

U.S. PATENT DOCUMENTS 5,099,245 * 3/1992 Sagey ................................... 342/357
5,365,516 * 11/1994 Jandrell ................................. 370/18
5,973,643 * 10/1999 Hawkes et al. ...................... 342/457
5,982,324 * 11/1999 Watters et al. .................. 342/357.06

* cited by examiner

Primary Examiner—Thomas H. Tarcza
Assistant Examiner—Dao L. Pham
(74) Attorney, Agent, or Firm—Philip R. Wadsworth; Bruce W. Greenhaus; Christopher O. Edwards (57) ABSTRACT

An apparatus and method for locating a remote station in a synchronous communications network using the time of arrival of a reference pilot signal at the remote station as a time reference. The time difference of arrival (TDOA) of GPS signals received by the remote station and other signals received from a base station, are measured relative to this reference time. From these measurements, the location of the remote station is determined. The invention treats the location issue as a TDOA problem.

8 Claims, 8 Drawing Sheets

METHOD AND APPARATUS FOR DETERMINING THE LOCATION OF A REMOTE STATION IN A CDMA COMMUNICATION NETWORK

BACKGROUND OF THE INVENTION

1. Field Of the Invention

Generally, the present invention relates to communication networks. More specifically, the invention relates to an apparatus and technique for locating a remote station in a code division multiple access system using a combination of satellite and other signal measurements.

2. Description of the Related Art

Deployment of location technologies in wireless networks is being driven by regulatory forces and carriers' desires to enhance revenues by differentiating service offering from those of competitors. In addition, in June 1996, the Federal Communications Commission (FCC) mandated support for enhanced emergency 911 (E-911) service. Phase I of the Order requires that sector and cell information be set back to a Public Safety Answering Point (PSAP) agency. Phase II of the Order requires that the location of the cellular transceiver be sent back to the PSAP. To comply with the FCC mandate, 77,000 total sites are to be equipped with automatic location technologies by the year 2005.

Many techniques are being considered to provide automatic location capability. One technique involves measuring the time difference of arrival of signals from a number of cell sites. These signals are triangulated to extract location information. Unfortunately, this technique requires a high concentration of cell sites and/or an increase in the transmission power of the sites to be effective. This is generally incompatible with a typical CDMA system, where each telephone transmits with only enough signal power to reach the closest cell site. As triangulation requires communication with at least three sites, the concentration of cell sites would have to be increased or the signal power of each wireless station would have to be increased.

In any event, each alternative has significant drawbacks. An increase in the number of cell sites would be too costly. Increases in signal power would add to the weight and cost of each wireless station and increase the likelihood of interference between wireless users. In addition, the triangulation approach does not appear to offer the accuracy required by the FCC mandate.

Another approach being considered involves the addition of complete Global Positioning System (GPS) functionality to the cellular telephone. Although, this approach would add significant cost and weight to the wireless station, would require acquisition of four satellites, and would be somewhat slow, nevertheless, it is the most accurate approach to support location services.

To speed the process, a third approach sends aiding information to the wireless station indicating where the wireless station should look in frequency for GPS carriers. Most GPS receivers use what is known as a GPS satellite almanac to minimize a search performed by the receiver in the frequency domain for a signal from a visible satellite. The almanac is a 15,000 bit block of coarse ephemeris—a table giving the coordinates of a satellite at certain times during a specified time period—and time model data for the entire constellation. The information in the almanac regarding the position of the satellite and the current time of day is approximate only. Without an almanac, the GPS receiver must conduct the widest possible frequency search to acquire a satellite signal. Additional processing is required to attain additional information that will aid in acquiring other satellites.

The signal acquisition process can take several minutes due to the large number of frequency bins that need to be searched. Each frequency bin has a center frequency and predefined width. The availability of the almanac reduces the uncertainty in satellite Doppler, or signal shift, and therefore the number of bins that must be searched. The satellite almanac can be extracted from the GPS navigation message or sent on the down (forward) link as a data or signaling message to the receiver. On receipt of this information, the receiver performs GPS signal processing to determine its location.

While this approach may be somewhat faster in determining the location of a wireless station, it still suffers from the prerequisite that the remote station first acquire at least four satellites. This is problematic in urban environments. Hence, there is a need for an invention that can speed up finding the location of a wireless station and improves service availability. Ideally, the invention would require a minimum number of satellite signals to make the determination.

The invention would be compatible with CDMA modulation systems and the techniques used in telecommunication systems servicing large numbers of system users. A more robust discussion of CDMA systems and techniques in this type of multiple access communication systems may be found in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein. Further, the invention ideally would be adaptable to other modulation systems and techniques used in other communication systems, such as time division multiple access (TDMA), frequency division multiple access (FDMA), and amplitude modulation (AM) schemes.

SUMMARY OF THE INVENTION

Broadly, the present invention relates to a communication network. More specifically, the invention relates to an apparatus and technique for locating the position of a remote station in a code division multiple access network using the time of arrival of a reference pilot signal at the remote station as a time reference. The time difference of arrival (TDOA) of GPS signals and other pilot signals received by the remote are measured relative to this reference time. From these measurements, the location of the remote station is determined. The invention treats the location issue as a TDOA problem.

One embodiment of the invention provides a method to determine a location of a remote station in a synchronous communications network, such as a CDMA network. A plurality of signals is received at a remote station, where the plurality of signals includes signals from the Global Positioning System (GPS) and signals transmitted from a terrestrial base stations. One of the signals received from the terrestrial base station is used to establish a reference time. In this embodiment, the network time signal is a reference pilot signal—such as a pilot signal that includes a zero phase pilot PN sequence transmitted from a base station in the communications network—but may be any type of signal sharing similar transmission characteristics. This pilot sequence is synchronized with the GPS system. Thereafter, a time difference of arrival for the plurality of timing signals is determined based upon the reference time, and the position for the remote station is determined, as discussed in the detailed description below, using these TDOAs.

In another embodiment, the invention provides an article of manufacture containing digital information executable by a digital processing device and used to determine the location of the remote station as described above. In another embodiment, the invention yields an apparatus used to determine the location of a remote station. The apparatus may comprise a remote station and a number of satellites that include transceivers used, in part, to transmit signals to the remote station. The apparatus may also include at least one base station that has, amongst other things, a transceiver used to communicate signals to the remote station. These signals include a timing signal synchronized with the satellite systems and used to establish a reference network time. Obviously, to receive signals, the remote station also includes a transceiver communicatively coupled to the base station and satellites, adapted to receive the satellite signals. The apparatus will also include a digital processing apparatus, such as a microprocessor, that is communicatively coupled to the network or one of its component parts.

The invention provides its users with numerous advantages. One advantage is that it speeds up the process of locating a remote station. Another advantage is that the number of satellite measurements required for determining the location is reduced. Yet another advantage is that the invention works when other techniques are precluded due to physical obstacles obstructing reception of satellite signals by the remote station. The invention also provides a number of other advantages and benefits that should become even more apparent after reviewing the following detailed descriptions of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF THE PREFERRED EMBODIMENTS

FIGS. 1 through 8 illustrate examples of various method and apparatus aspects of the present invention. For ease of explanation, but without any limitation intended, these examples are described in the context of a digital telecommunication network incorporating wireless links, one example of which is described below.

APPARATUS COMPONENTS AND INTERCONNECTIONS

A general discussion concerning the processing of signals for transmission in telecommunication system may be found Electronic Industry Association standard TIA/EIA/IS-95-A entitled "Mobile Station-Based Station Compatibility Standard for Dual-Mode Wideband Spread Spectrum Cellular Systems, incorporated by reference herein, and other transmission standards well known in the art.

Figure 1:
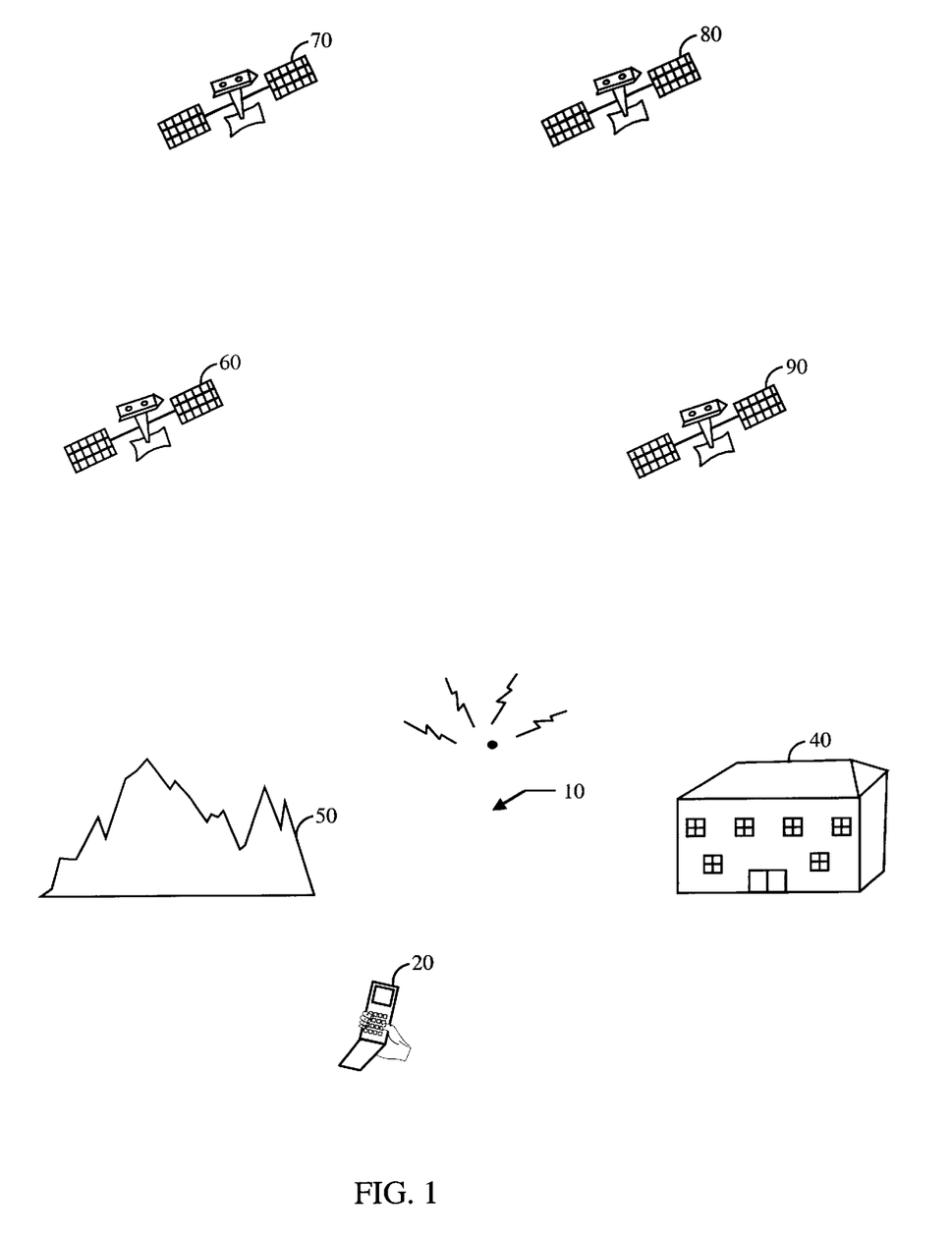
FIG. 1 is a diagram showing an illustrative implementation of a base station and remote station of a synchronized communication system.

FIG. 1 is a diagram showing an implementation of a base station 10 and a remote station 20 in a synchronous CDMA communication network. The network is surrounded by buildings 40 and ground based obstacles 50. The base station 10 and remote station 20 are disposed in a GPS environment having several GPS satellites, of which four are shown 60, 70, 80 and 90. Such GPS environments are well known; for example, see for example Hofmann-Wellenhof, B., et al., GPS Theory and Practice, Second Edition, New York, N.Y.: Springer-Verlag Wien, 1993. In a typical prior art GPS application, at least four satellites are required in order for a GPS receiver to determine its position. In contrast, the present invention provides a method and apparatus for determining the position of a remote station 20 using signals from as few as one GPS satellite and, in the simplest case, two other terrestrial based signals.

Figure 2:
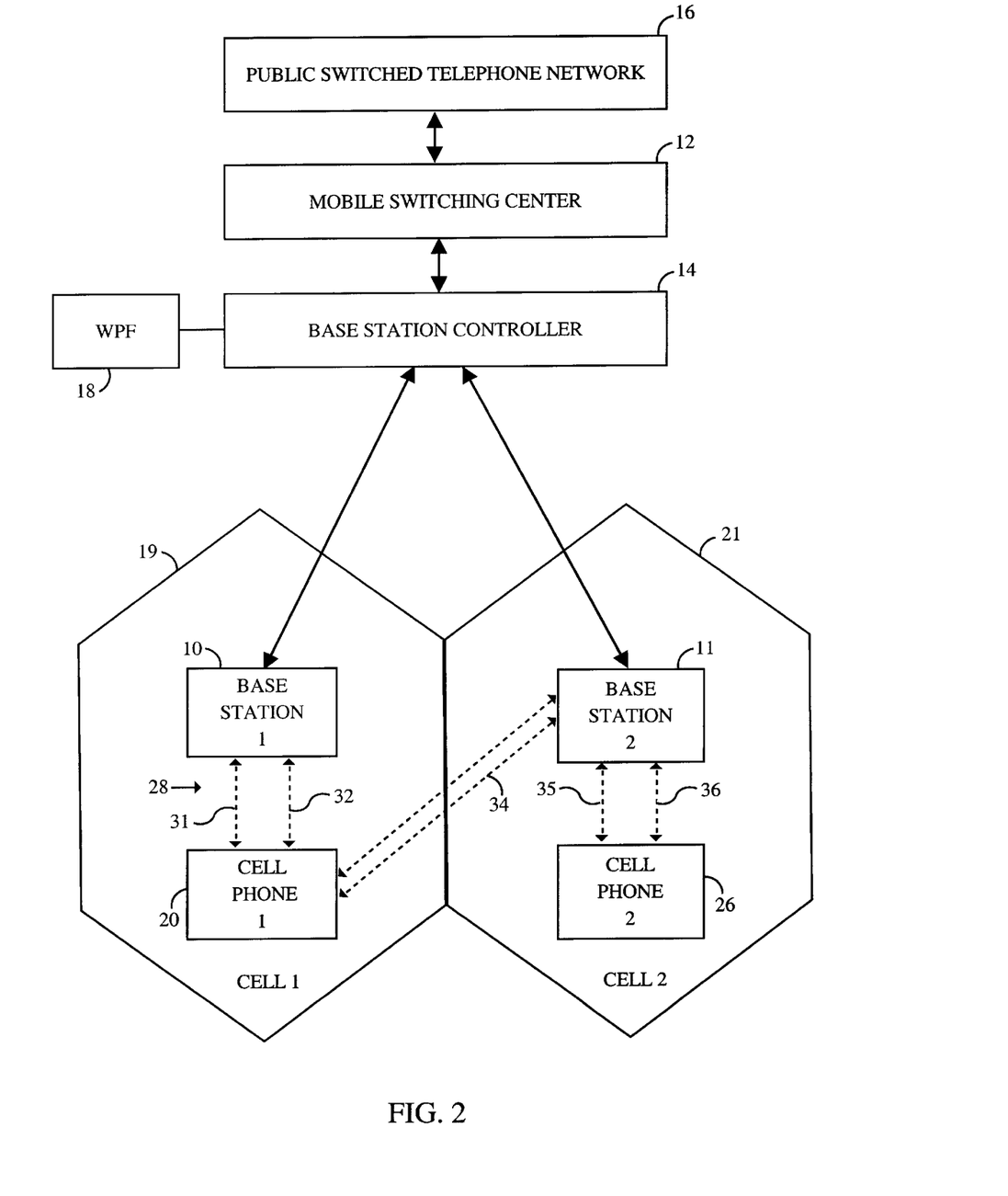
FIG. 2 is a block diagram of an exemplary CDMA cellular telephone system.

FIG. 2 shows a block diagram of a CDMA network 30. The network 30 includes a mobile switching center (MSC) 12 having a base station controller (BSC) 14. A public switched telephone network (PSTN) 16 routes calls from traditional terrestrial based telephone lines and other networks (not shown) to and from the MSC 12. The MSC 12 routes calls from the PSTN 16 to and from a source base station 10 associated with a first cell 19 and a target base station 11 associated with a second cell 21. In addition, the MSC 12 routes calls between the base stations 10, 11. The source base station 10 directs calls to the first remote station 20 within the first cell 19 via a first communications path 28. The communications path 28 is a two-way link having a forward link 31 and a reverse link 32. Typically, when the base station 10 has established voice communications with the remote station 20, the link 28 includes a traffic channel.

A wireless positioning function (WPF) 18 is shown communicatively coupled to the BSC 14, but may be coupled directly or in-directly to other network elements such as the MSC 12. The WPF 18 generally comprises a digital processing device, storage, and other elements (all not shown) commonly found in such devices. The WPF 18 may be put to a variety of uses, such as estimating the one-way time delay for a signal sent between the base station 10 and the remote station 20, or monitoring and accounting for the time offset between a reference time and a time of arrival of all other signals. The WPF 18 is discussed in fuller detail below.

Although each base station 10, 11 is associated with only one cell, a base station controller often governs or is associated with base stations in several cells. When the remote station 20 moves from the first cell 19 to the second cell 21, the remote station 20 begins communicating with the base station associated with the second cell. This is commonly referred to as a "hand-off" to the target base station 11. In a "soft" handoff, the remote station 20 establishes a second communications link 34 with the target base station 11 in addition to the first communications link 28 with the source base station 10. After the remote station 20 crosses into the second cell 21 and the link with the second cell has been established, the remote station may drop the first communications link 28.

In a hard handoff, the operation of the source base station 10 and the target base station 11 typically are different enough that the communications link 34 between the source base station must be dropped before the link to the target base station can be established. For example, when a source base station is within a CDMA system using a first frequency band and target base station is in a second CDMA system using a second frequency band, the remote station will not be able to maintain links to both base stations concurrently, since most remote stations do not have the ability to tune to two different frequency bands concurrently. When the first remote station 20 moves from the first cell 19 to the second cell 21, the link 28 to the source base station 10 is dropped and a new link is formed with the target base station 11.

Figure 3:
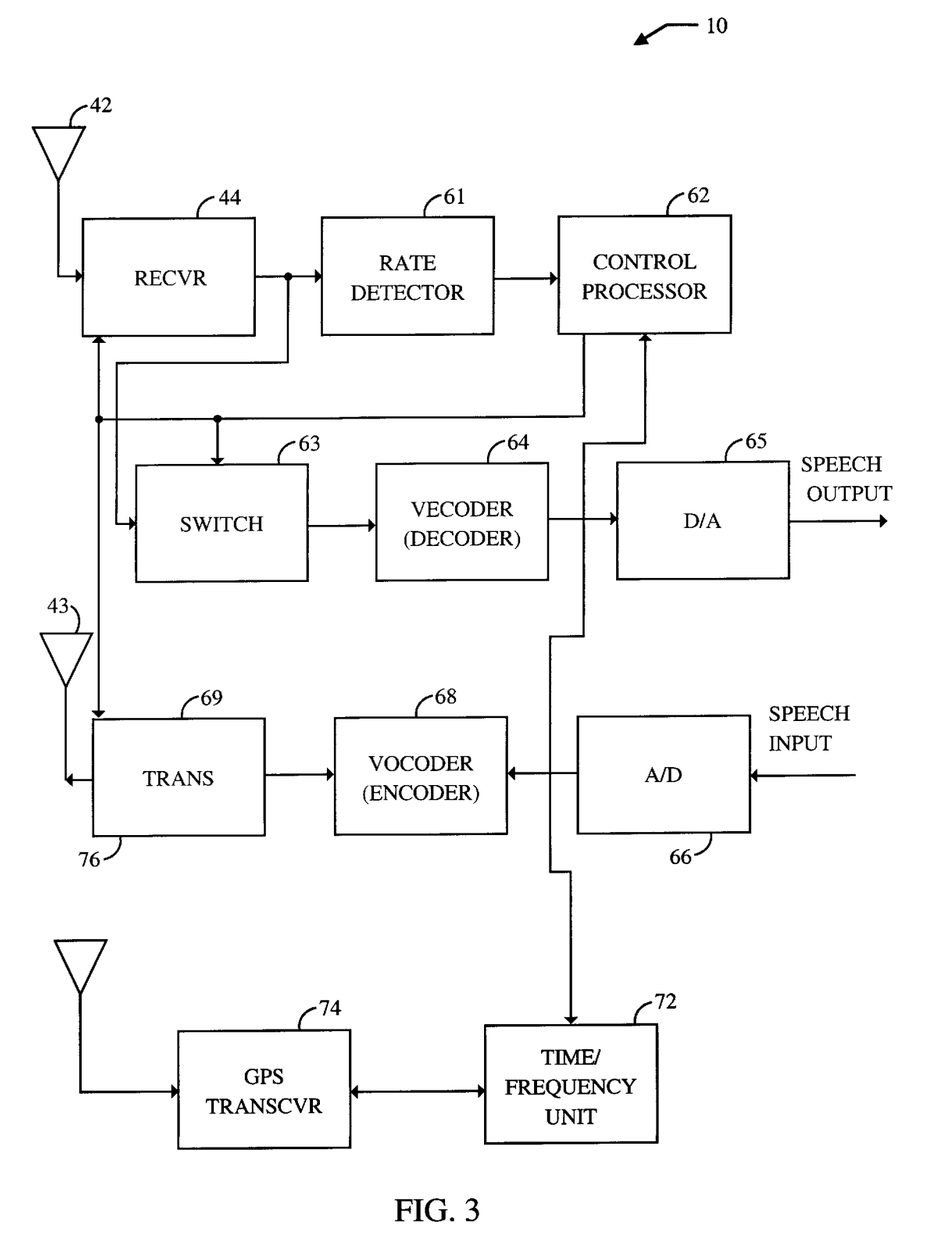
FIG. 3 is a simplified representation of a base station constructed in accordance with the present invention.

FIG. 3 is a simplified representation of a base station 10 in accordance with the present invention. In an alternate embodiment, the base station 10 includes additional functionality that allows the base station to determine the position of a remote station 20, as will become clear from the description provided below. A conventional base station 10 includes a receive CDMA antenna 42 for receiving CDMA signals and a transmit CDMA antenna for transmitting CDMA signals. Signals received by the antenna 42 are routed to a receiver 44. In practice, the receiver 44 includes demodulators, de-interleavers, decoders and other circuits as will be appreciated by those skilled in the art. The received signal is allocated to an appropriate channel for which a rate detector 60 is associated. A control processor 62 uses the rate of the detected signal to detect speech. If speech is detected in a received frame, the control processor 62 switches the received frame to a vocoder 64 via a switch 63. The vocoder 64 decodes the variable rate encoded signal and provides a digitized output signal in response thereto. The digitized de-vocoded signal is converted to speech by a digital-to-analog converter 65 and an output device such as a speaker (not shown).

Input speech from a microphone or other input device (not shown) is digitized by an analog-to-digital converter 66 and vocoded by a vocoder encoder 68. The vocoded speech is input to a transmitter 69. In practice, the transmitter 69 includes modulators, interleavers and encoders as will be appreciated by those skilled in the art. The output of the transmitter 69 is fed to the transmit antenna 43.

Base station 10 is also equipped with a GPS antenna 76, receiver 74 and timing and frequency unit 72. The timing and frequency unit accepts signals from the GPS engine of the GPS receiver and uses them to generate timing and frequency references for the proper operation of the CDMA system. Accordingly, in many such CDMA systems, each cell site uses a GPS time base reference from which all time critical CDMA transmissions (including pilot sequences, frames and Walsh functions) are derived. Such conventional timing and frequency units and GPS engines are common in CDMA systems and are well known in the art. Conventional timing and frequency units provide frequency pulses and timing information. In contrast, the timing and frequency unit 72 of the present invention preferably also outputs the elevation angle, pseudo range, satellite identification (i.e., pseudo noise (PN) offset associated with each satellite) and the Doppler shift associated with each satellite in order to assist the remote station 20 in acquiring the satellites (i.e., decrease the amount of time required to acquire a satellite). This information is typically available within conventional timing and frequency units, but is typically neither needed nor provided to external devices. The additional information provided by the timing and frequency unit 72 may be communicated to the BSC 14 in the same manner as is done with regard to frequency and timing information in a base station.

Figure 4:
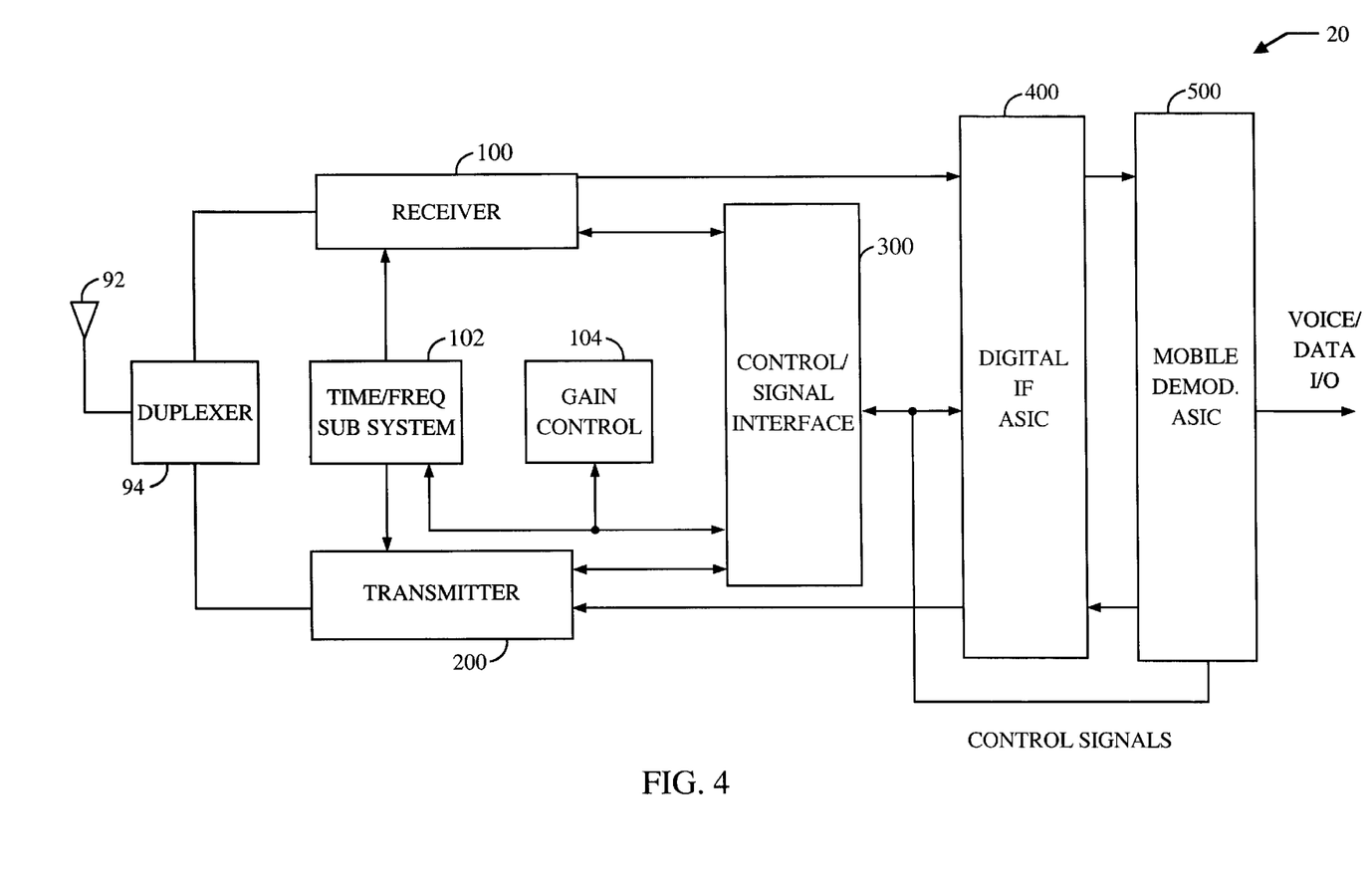
FIG. 4 is a block diagram of the remote station of the system for determining the position of a wireless transceiver of the present invention.

FIG. 4 is a block diagram of the remote station 20 in accordance with one embodiment of the present invention. The remote station 20 preferably includes a bi-directional antenna 92 adapted to receive CDMA transmissions as well as GPS signals. In an alternative embodiment, separate antennas may be used for receiving and transmitting GPS signals, CDMA signals, and other signals, such as alternative system signals. The antenna 92 preferably feeds a duplexer 94. The duplexer 94 preferably feeds a receiver 100 and is preferably fed by a transmitter 200. A time frequency subsystem 102 provides analog and digital reference signals for the receiver 100, a control signal interface 300, and the transmitter 200, as will be appreciated by those skilled in the art. CDMA power control is provided by a gain control circuit 104.

In one embodiment, the control signal interface 300 is a digital signal processor (DSP). Alternatively, the control signal interface may be another circuit capable of performing gain control functions. The control signal interface 300 provides control signals for the remote station 20. The receiver 100 provides for radio frequency (RF) down conversion and a first stage of intermediate frequency (IF) down conversion. A digital IF application specific integrated circuit (ASIC) 400 provides for a second stage of IF to baseband down conversion, sampling and A/D conversion. A mobile demodulator ASIC 500 searches and correlates digital baseband data from the digital IF ASIC 400 to ascertain pseudo-ranges as discussed more fully below.

The pseudo-ranges, along with any voice or data, is passed by the mobile demodulator 500 to the digital IF modulator 400. The digital IF modulator 400 provides a first stage IF up conversion of the data received from the mobile demodulator 500. A second stage of IF up conversion and RF up conversion of these signals is provided by the transmitter circuit 200. These signals are then transmitted to the base station 10 and processed in accordance with the method of the invention discussed below. It should be noted that location information to be communicated between the remote station 20 and the BSC 14, such as pseudo-ranges received by the remote station 20, are preferably communicated by the remote station 20 to the base station 10 via a data burst type message, such as short message service (SMS) defined by industry standard TIA/EIA/IS-167, published by the Telephone Industry Association. Such messages are transmitted through the base station 10 to the BSC 14. Alternatively, a newly defined burst type message could be transmitted by the remote station 20 to the base station 10.

Figure 5:
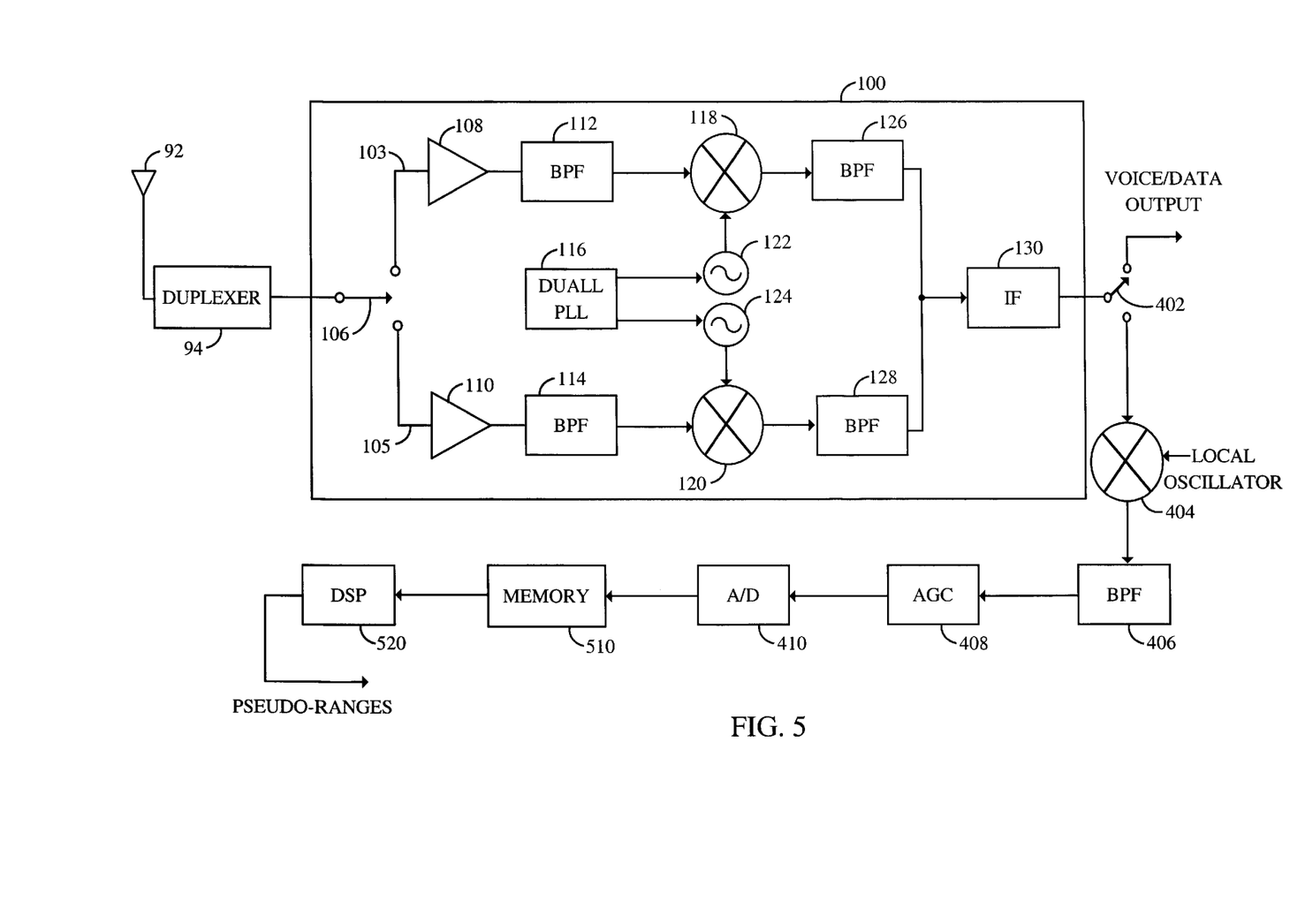
FIG. 5 is a block diagram of an showing an implementation of a portion of the receiver, control signal interface, digital IF, and wireless demodulator circuits of the remote station of the present invention.

FIG. 5 is a block diagram of an illustrative implementation of a portion of the receiver, control signal interface, digital IF, and mobile demodulator circuits of the remote station 20 of the present invention. The transmitter portion of the remote station 20 is essentially identical to the transmitter portion of a conventional remote station and therefore is not discussed herein for the sake of brevity. In the preferred embodiment, the receiver 100 is implemented with first and second paths 103 and 105, respectively, which are connected to the antenna 92 via the duplexer 94 via a first switch 106. It will be understood by those skilled in the art that more integration between the two-way communication device and the GPS receiver could take place. Alternatively, two separate receivers with an appropriate interface could achieve the objective of the present invention.

The first path 103 down converts received CDMA signals and provides conventional CDMA RF down converted output signals. The first path 103 includes a low noise amplifier 108, a first bandpass filter 112, a first mixer 118 and a second bandpass filter 126. The second path 105 downconverts GPS signals from the GPS satellites 60, 70, 80 or 90 of FIG. 1. The second path 105 includes a second low noise amplifier 110 which feeds a third bandpass filter 114. The output of the bandpass filter 114 is input to a second mixer 120. The output of the second mixer is fed to a fourth bandpass filter 128. The first and second mixers are fed by first and second local oscillators 122 and 124, respectively. The first and second local oscillators 122 and 124 operate at different frequencies under control of a dual phase locked loop (PLL) 116. The dual PLL insures that each local oscillator 122 and 124 maintains a reference frequency effective to down convert either a received CDMA signal, in the case of the first mixer 118, or a received GPS signal, in the case of the second mixer 120. The outputs of the second and fourth bandpass filters 126 and 128 are coupled to a first IF section 130 of conventional design.

The output of the IF demodulator 130 is input to a second switch 402 in the digital IF ASIC 400. The first and second switches 106 and 402 operate under control of the control signal interface 300 to divert a received signal for voice or data output processing in a conventional CDMA manner or GPS processing by a third mixer 404, fifth bandpass filter 406, an automatic gain control circuit 408 and an analog to digital converter 410. The second input to the third mixer 404 is a local oscillator output. The mixer 404 converts the applied signal to baseband. The filtered, gain controlled, signal is fed to an analog-to-digital converter ("A/D") 410. The output of the A/D 410 includes a first digital stream of in-phase (I) components and a second digital stream of quadrature components (Q). These digitized signals are fed to a digital signal processor 520, which processes the GPS signal and outputs the pseudo-range information required for position determination.

In an alternative embodiment of the present invention, the outputs from the two bandpass filters 126, 128 are fed to a baseband and application specific integrated circuit (ASIC) that digitally converts the IF frequency signals output from the baseband filters 126, 128 to baseband and outputs a stream of digital values that represent the quadrature and in-phase baseband signals. These signals are then applied to a searcher. The searcher is essentially identical to conventional searches used in CDMA demodulators. However, the searcher that is preferably used is programmable to allow the searcher to search for either a PN code associated with the CDMA signals transmitted from the base station or the PN code associated with the GPS satellites. The searcher discriminates between CDMA channels when receiving CDMA signals from the base station and determines the GPS satellite from which received GPS signals are being transmitted when in the GPS mode. In addition, once the GPS signals are acquired, the searcher indicates the time offset associated with the PN code essentially in a conventional manner in order to determine the pseudo range associated with satellites from which signals are being received, as will be understood by those skilled in the art.

It will be understood by those skilled in the art that a double conversion process, such as is shown in FIG. 5, or alternatively, a single conversion and IF sampling technique, could be used to produce the required I and Q samples. Furthermore, the structure of the embodiment shown in FIG. 5 may be altered in many ways that would not affect the operation of the present invention. For example, a conventional programmable processor may be used in place of the DSP that is shown in FIG. 5. The memory 510 may not be required if the rate at which data flows through the system is such that no buffers are required. The bandpass filter 406 and automatic gain control circuit 408 may be omitted under certain conditions, implemented using digital techniques or analog techniques, or other wise altered. Many other such variations to the structure that is shown in FIG. 5 may be made without altering the invention. Furthermore, it should be noted that an alternative embodiment may have greater or lesser sharing of hardware and software resources between the GPS and wireless receiver.

Figure 6:
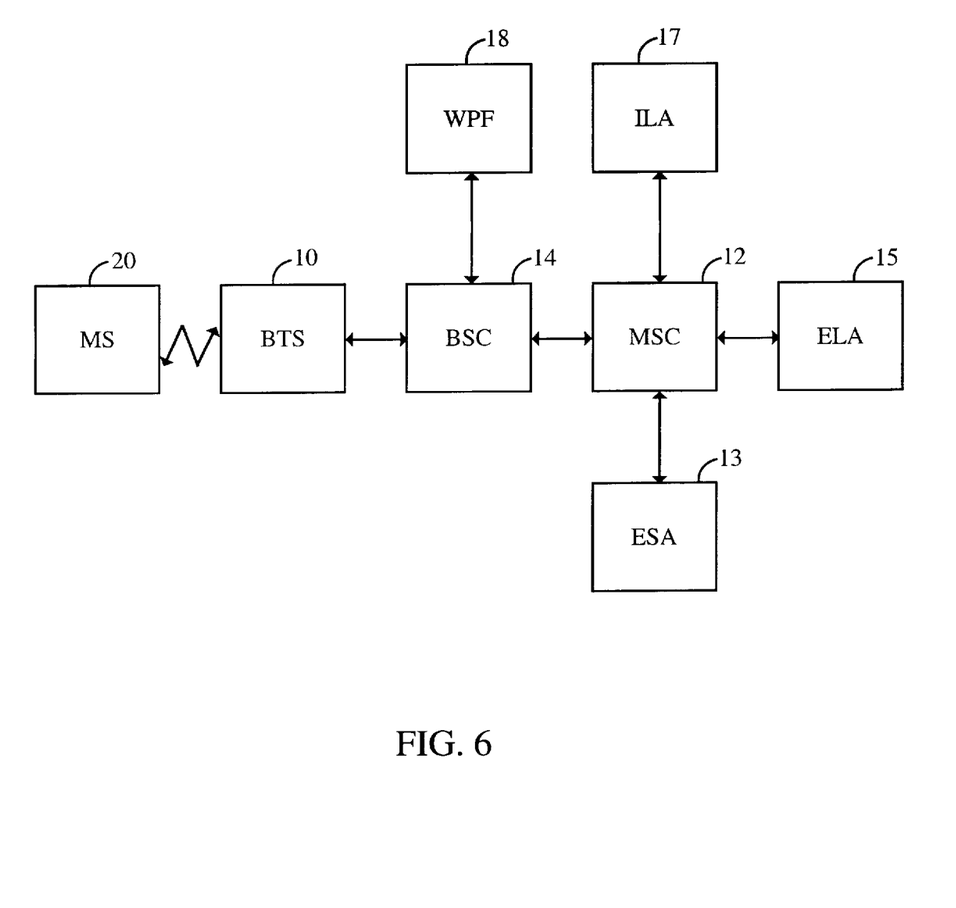
FIG. 6 illustrates of a functional model for determining the location of a remote station.

FIG. 6 is a high level block diagram of the components of a communication system which includes the present invention. In operation, in accordance with the inventive method, the WPF 18, using its own GPS receiver (not shown), gathers information relative to its own position and predicts the value of data relative to the base station 10. This information includes, but is not limited to, all of the satellites currently being viewed by the GPS transceiver 74 (FIG. 3), their elevation angle, Doppler shift, and pseudo ranges at a specific time. Note that the GPS receiver at the WPF 18 has up-to-date information on time of arrival, frequency, and PN offset of each satellite in view, because it is always tracking all satellites that are in view. Alternatively, the WPF 18 could predict satellite information corresponding to a subset of only those satellites that can be viewed by the remote station 20, assuming that the WPF 18 has stored information regarding the street width and height of the surrounding buildings. That is, if the WPF 18 has the ability to determine that the remote station will have an obstructed view of one or more satellites, then the WPF 18 will not predict satellite information regarding those satellites that are obstructed.

It should be noted that a conventional GPS receiver notes the time at which satellite signals are received with respect to the receiver's internal GPS clock. However, the receiver's internal GPS clock is not accurately synchronized to "true" GPS time. Therefore, the receiver cannot know the exact point in "true" GPS time at which the satellite signals are received. This situation is further described and mitigated in U.S. patent application Ser. No. 09/040,501 entitled "System and method for Determining The position of a wireless CDMA Transceiver," filed Mar. 17, 1998, assigned to the assignee of the present invention, and incorporated by reference herein. In the present invention, and as discussed below, the time difference of arrival (TDOA) between GPS signals received at the remote, measured relative to a specified reference time, are used. This assumes that all base stations in the network are synchronized with the GPS network.

The network described herein allows the position of a remote station to be determined at any time utilizing the WPF 18, shown in FIG. 2, as long as the remote station 20 is within the radio coverage area of the communication network, and as long as there is sufficient quality of service on the network. Alternatively, the remote station can also determine its own location. The process of determining the position of a remote station may be initiated by the remote station 20, the network, or an external entity, such as an internal location application (ILA) 17, an external location application (ELA) 15, or an emergency service application (ESA) 13, all shown in FIG. 6. Each of these components 13, 15, 17 may be either hardware or software which is capable of requesting and/or receiving location information. In one embodiment, the ILA 17 is a terminal coupled to the BSC 14 which allows an operator to directly request and receive location information regarding a remote station 20. Alternatively, the ILA 17 is a software application executed by a processor within the MSC 12.

The WPF 18 is preferably a conventional programmable processor capable of accepting raw data, such as the time of arrival of a reference pilot signal, GPS signals, and other signals, and then calculating a reference time based on the pilot signal and TDOA for the GPS signals and other signals based upon the reference time. The WPF 18 would then use these measurements to determine the location of the remote station. However, any device that is capable of performing the duties of the WPF 18 may be used. For example, the WPF 18 may be implemented as an ASIC, a discrete logic circuit, a state machine, or a software application within another network device (such as the BSC 14). Furthermore, it should be understood that the WPF 18 may be located within the base station 10, the BSC 14 as shown in FIG. 2, or elsewhere in the network. Conceptually speaking, the WPF 18 is a software application that may be executed by a dedicated processor that is in communication with the BSC 14. A conventional base station, BSC, or MSC need not be significantly modified in order to implement the present invention.

Despite the specific foregoing descriptions, ordinarily skilled artisans having the benefit of this disclosure will recognize that the apparatus discussed above may be implemented in a synchronous telecommunications system of different construction without departing from the scope of the present invention.

METHOD OF OPERATION

Various apparatus aspects of the present invention were disclosed above. To further facilitate an understanding of the invention, the method and article of manufacture implementations are discussed in this section.

Conventional wireless communication networks using GPS receivers use Time Of Arrival (TOA) measurements from four satellites to solve for the four unknowns (x, y, z, t), where t is the time bias in a user terminal clock. In contrast, most terrestrial based networks use Time Difference of Arrival (TDOA) to solve for the unknowns (x,y,z). The method of the present invention applies a TDOA methodology to signals received from either type, or both types, of communication networks and a GPS network for location determination purposes.

For example, taking advantage of the fact that CDMA is a synchronous system, the time of arrival at a remote station of a reference pilot can be used as a time reference to measure a TDOA of GPS signals and other pilot signals relative to the reference. Using this TDOA approach, rather than focusing on TOA for the signals, reduces the number of measurements needed to calculate the position of the remote station. As mentioned above, this approach requires that all base stations in the communications network are synchronized with the GPS network. That is, the zero phase pilot PN sequence transmitted from the base station antenna coincides with GPS system time. In one embodiment, any time offset between the two networks is monitored, and adjustments made, by the WPF 18 shown in FIG. 2. As will be appreciated by one schooled in the art, and contrary to using round-trip-delay (RTD) measurements in TOA methods, multipath of signals plays a negative role in the present invention in accurately locating the remote station (MS). However, methods to mitigate multipath signals are known to those skilled in the art.

In this invention, base stations are treated as pseudo satellites. The WPF 18 stores base station almanac information, or has access to such information. A base station almanac will contain a three dimensional position for the radiating point of a sector, and may contain transmission timing information, such as P-N offset and clock correction relative to GPS network time (GPS time). This allows the communications network to consider, for location purposes, all signals received by the remote station because it is using one common time reference, GPS time, in this case. For example, in one embodiment, the method may use both forward and reverse link TDOA measurements when available.

Basis for the Method

In this discussion, assume that a base station i has its pilot emitted at a base station antenna at time offset $\Delta_i$ from true GPS time. Further, the following notations are used:

$\rho_{sk}$=TOA of the $k^{th}$ satellite signal relative to MS system time;

$d_i$=one-way delay between MS and base station i measured;

$\phi_{ij}$=pilot phase difference between base stations i and j;

$\tau_{sk}$=delay corresponding to distance between the $k^{th}$ satellite and the MS;

$\tau_{bj}$=delay corresponding to distance between the $j^{th}$ base station and the MS;

$(x_{bi}, y_{bi}, z_{bi})$=location of the $i^{th}$ base station;

$(x_{sk}, y_{sk}, z_{sk})$=location of the $k^{th}$ satellite; and $(x,y,z)$=location of the MS, where the respective time relationships are diagramed in Table 1 as follows:

TABLE 1

Measurements Time Line

The distance between the $k^{th}$ satellite and the MS is proportional to $$\tau_{sk} = \rho_{sk} + d_i + \Delta_i \quad (1)$$

where $\rho_{sk}$ is a TDOA between two signals received at the MS, or a signal from the $k^{th}$ satellite and a signal from the $i^{th}$ base station. This TDOA can be expressed in terms of the MS coordinates as:

$$\rho_{sk} = \sqrt{(x_{sk} - x)^2 + (y_{sk} - y)^2 + (z_{sk} - z)^2} - \sqrt{(x_{bi} - x)^2 + (y_{bi} - y)^2 + (z_{bi} - z)^2} - \Delta_i \quad (2)$$

Similarly, the distance between the $j^{th}$ base station and the MS is proportional to $$\tau_{bj} = \phi_{ij} - (\Delta_j - \Delta_i) + d_i \quad (3)$$

where $\phi_{ij}$ is a TDOA between two pilot signals received at the MS, or a signal from the $j^{th}$ base station and a signal from the $i^{th}$ base station. Also, $\phi_{ij}$ can be expressed in terms of the mobile coordinates as $$\phi_{ij} = \sqrt{(x_{bj} - x)^2 + (y_{bj} - y)^2 + (z_{bj} - z)^2} - \sqrt{(x_{bi} - x)^2 + (y_{bi} - y)^2 + (z_{bi} - z)^2} + (\Delta_j - \Delta_i) \quad (4)$$

When $\Delta_j$ are all calibrated, then the TDOA measurements in equations (2) and (4) can be used to solve for (x,y,z) of the MS.

Because three unknowns need to be discovered, a minimal of three sets of measurements are required. The following measurements may be used:

1) Three satellite measurements;
2) Two satellite measurements and one pilot phase difference; or
3) One satellite measurement and two pilot phase differences.

When compared to prior art methods, it is readily apparent that disclosed method of the present invention requires fewer measurements to be taken than conventional location methods.

Search Window Center

Each satellite has its own "search window" center. This window center depends upon how far the satellite is from a serving base station. Since a MS and a base station's timing are offset by a one-way delay in any signal transmitted from one to the other, an estimate of that delay is needed to inform the MS where to center its search window so that it may more efficiently search for a satellite. If round trip delay information is not available from the communication network, the WPF 18 shown in FIG. 2 can use one or more pilot strength measurements to estimate the one-way delay. Information on estimating any path loss between a base station and a MS is disclosed in a U.S. Pat. No. 5,799,005, entitled "System and Method for Determining Received Pilot Power and Path Loss in a CDMA Communication System," assigned to the assignee of the present invention and incorporated by reference herein.

Once the WPF 18 determines the path loss and the morphology of the radio frequency (RF) environment associated with the serving base station, it may approximate the distance or one-way delay (d) between the base station and MS. Mapping propagation path loss to distance, and eventually to time, is well known in the art and can be accomplished using existing methods. Information on mapping path loss to distance is disclosed in a U.S. Pat. No. 5,710,758, entitled "Wireless Network Planning Tool," assigned to the assignee of the present invention and incorporated by reference herein. Using MS system time as a reference, the search window center is given by $$c_s = \rho_b i - d \quad (5)$$

Search Window Size

Figure 7:
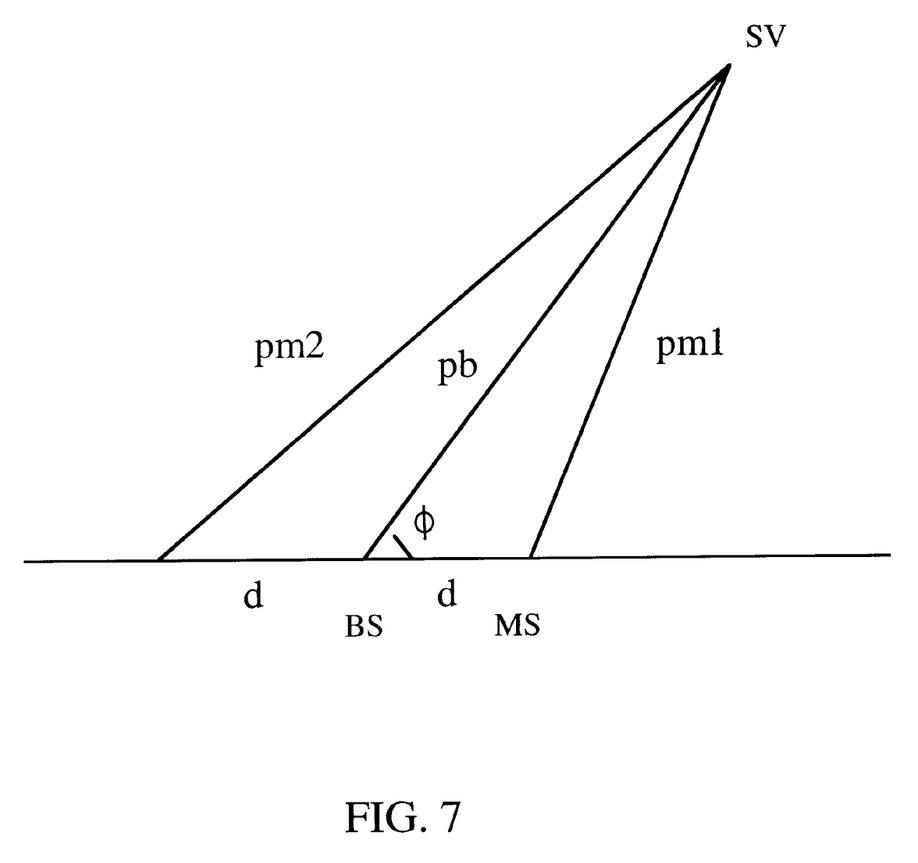
FIG. 7 shows the calculations of the search window size and center in the time domain.
Figure 8:
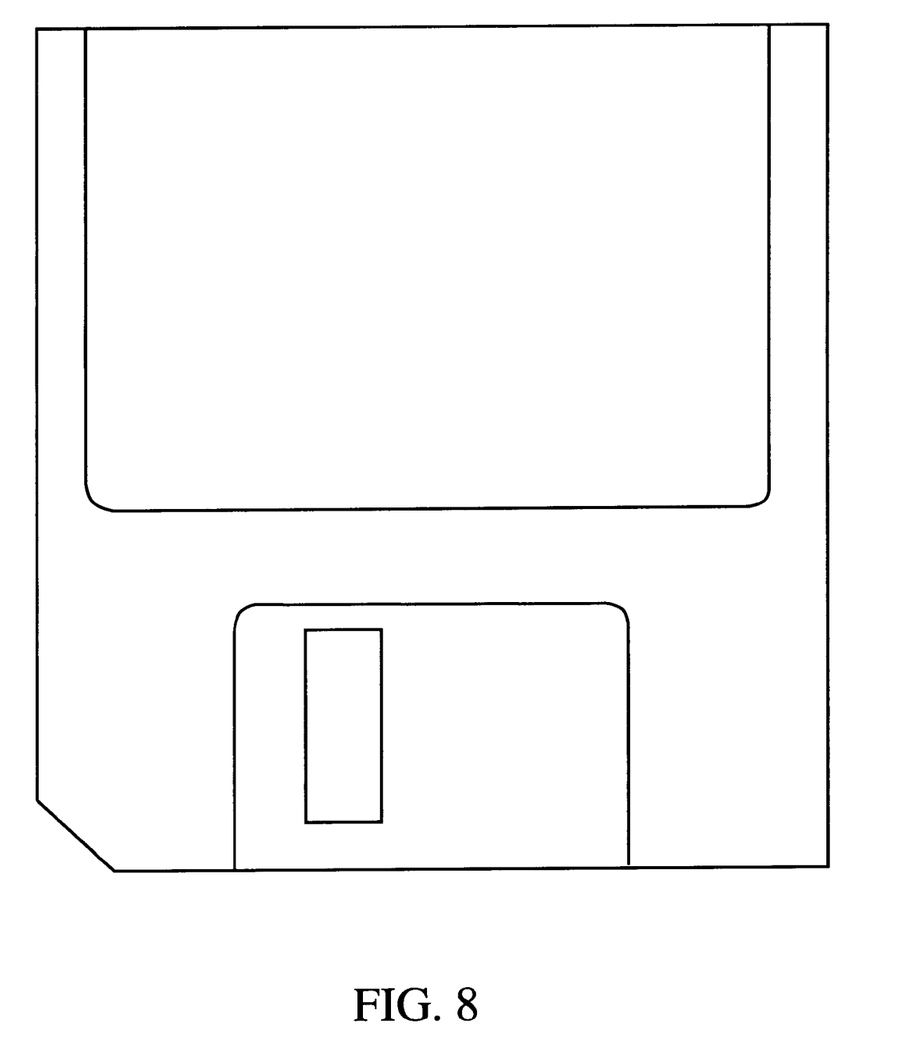
FIG. 8 shows an exemplary example of an article of manufacture.

Search window size is easily explained using FIG. 7. Given a range to a satellite at an elevation angle ($\phi$) from a bas station BS, and the one-way delay, then:

Similarly, $$\rho_{m1}^2 = \rho_b^2 + d^2 - 2\rho_{m1} d \cos(\phi).$$

-continued
$$\rho_{m2}^2 = \rho_b^2 + d^2 + 2\rho_{m2} d \cos(\phi).$$

Using $$\rho_{m1} + \rho_{m2} = 2\rho_b$$

then $$\rho_{m2} - \rho_{m1} = 2d\cos(\phi)$$

Even if d does not directly correspond to a "line of sight distance," the above equation conservatively estimates the window size. In one embodiment, the signal search pattern is performed using a constant Doppler bin and in the range direction from early signal arrival to late signal arrival to avoid confusion and inaccuracies due to a signals multipath characteristics. With d is an estimate of the one-way delay, the WPF 18 will determine the search window size to be $$w_s = 2\alpha d \cos\phi \quad (6)$$

where $\alpha$ is a designated factor greater than 1, reflecting the confidence in estimating d.

Article of Manufacture

A method as described above may be implemented, for example, by operating the WPF 18 to execute a sequence of machine-readable instructions. These instructions may reside in various types of signal-bearing media. In this respect, one aspect of the present invention concerns an article of manufacture comprising a signal-bearing media tangibly embodying a program of machine-readable instructions executable by a digital signal processor to perform a method to locate a transceiver used in a synchronous communications network employing wireless links.

This signal-bearing medium may comprise, for example, RAM (not shown) contained within the communications network. Alternatively, the instructions may be contained in another signal-bearing media, such as a magnetic data storage diskette 800 shown in FIG. 8, directly or indirectly accessible to the WPF 18 shown in FIG. 2. Whether contained within the communications network or elsewhere, the instructions may be stored on a variety of machine-readable data storage media, such as a direct access storage device, magnetic tape, electronic read-only memory, an optical storage device, or other suitable signal-bearing storage media. In an illustrative embodiment of the invention, the machine-readable instructions may comprise lines of compiled C, or C++, or other suitable coding language commonly used by those skilled in the programming arts.

OTHER EMBODIMENTS

While there have been shown what are presently considered to be preferred embodiments of the invention, it will be apparent to those skilled in the art that various changes and modifications can be made without departing from the scope of the invention as defined by the appended claims.

What is claimed is:

1. A method to determine a location of a remote station in a synchronous communications network, comprising:

receiving a network time signal at a remote station, wherein receipt of the network time signal establishes a reference time and the network time signal is a reference pilot signal which includes a zero phase pilot PN sequence transmitted from a base station in the communication network;

receiving a plurality of signals at the remote station, the plurality of signals comprising at least a first signal transmitted from a global positioning network (GPS), the at least a first signal being synchronized with the network time signal;

determining a time difference for the each of the plurality of signals; and determining a location for the remote station using the time difference of arrivals.

2. A method to determine a location of a remote station in a synchronous communications network, comprising:

receiving a network time signal at a remote station, wherein receipt of the network time signal establishes a reference time and the network time signal is a reference pilot signal and wherein the remote station also receives other signals transmitted from the GPS network and other pilot signals;

receiving a plurality of signals at the remote station, the plurality of signals comprising at least a first signal transmitted from a global positioning network (GPS), the at least a first signal being synchronized with the network time signal;

determining a time difference for the each of the plurality of signals; and determining a location for the remote station using the time difference of arrivals.

3. The method in accordance with claim 2, wherein determining a position for the remote station using the time difference of arrivals is performed by a wireless positioning function (WPF), the WPF monitoring any time offset between the zero phase pilot PN sequence and GPS time, the WPF making adjustments if necessary to keep the bases station signals timing synchronized with the GPS time.

4. An apparatus used to determine a location of a remote station in a synchronous communication network including a global positioning network (GPS), comprising:

a remote station including a remote station transceiver, the first remote transceiver capable of receiving a plurality of signals, the plurality of signals comprising at least a first signal transmitted from the GPS communicatively coupled to the remote station;

at least one base station communicatively coupled to the remote station and including a base station transceiver, the base station transceiver capable of transmitting a network timing signal to the remote station, the network timing signal being synchronized with signals received from the GPS network, and wherein receipt of the network timing signal establishes a reference time;

determining a time difference of arrival between at least two of the plurality of signals received by the remote station; and determining a position for the remote station using the time difference of arrivals.

5. An apparatus used to determine a location of a wireless transceiver in a synchronous communications network, comprising:

at least one satellite;

a satellite transmitter located at each of said at least one satellite for transmitting satellite signals;

a base station including a digital signal processing unit, wherein said base station transmits a reference pilot signal and other signals; and a transceiver in wireless communication with said at least one satellite and said base station, said transceiver receiving said reference pilot signal and said at least one satellite signals, wherein said reference pilot signal is used to measure a time difference of arrival (TDOA) for each of said at least one satellite signals and said other signals, if any, and wherein said digital signal processing unit uses said TDOAs to determine the location of said transceiver.

6. The apparatus in accordance with claim 5, wherein said at least one satellite is a global positioning network satellite.

7. The apparatus in accordance with claim 6, wherein said base station is a code division multiple access base station.

8. An apparatus used to determine a location of a wireless transceiver in a synchronous communications network, comprising:

at least one satellite;

a satellite transmitter means located at each of said at least one satellite for transmitting satellite signals;

a base station including a means for processing digital signals, wherein said base station transmits a reference pilot signal and other signals; and a transceiver means for communicating with said at least one satellite and said base station, said transceiver means receiving said reference pilot signal and said at least one satellite signals, wherein said reference pilot signal is used to measure a time difference of arrival (TDOA) for each of said at least one satellite signals and said other signals, if any, and wherein said means for processing digital signals uses said TDOAs to determine the location of said transceiver.

* * * * *